United States Patent [19]

Kouchich et al.

[11] 4,041,436
[45] Aug. 9, 1977

[54] CERMET VARISTORS

[75] Inventors: Allan Kouchich, Milwaukee; George W. Taylor, Oak Creek, both of Wis.

[73] Assignee: Allen-Bradley Company, Milwaukee, Wis.

[21] Appl. No.: 625,605

[22] Filed: Oct. 24, 1975

[51] Int. Cl.² .............................. H01C 7/10
[52] U.S. Cl. ........................ 338/21; 338/20; 252/519; 252/518; 428/432
[58] Field of Search ............ 252/518, 519; 338/20, 338/21; 106/54; 428/432

[56] References Cited

U.S. PATENT DOCUMENTS

| | | | |
|---|---|---|---|
| 3,477,055 | 11/1969 | Herbst et al. | 252/518.1 |
| 3,598,763 | 8/1971 | Matsuoka et al. | 252/518 |
| 3,669,907 | 6/1972 | Kohashi et al. | 252/519 X |
| 3,725,836 | 4/1973 | Wada et al. | 338/21 |
| 3,868,334 | 2/1975 | Van Loan | 252/518 X |
| 3,928,242 | 12/1975 | May | 252/520 X |

Primary Examiner—Benjamin R. Padgett
Assistant Examiner—E. Suzanne Parr
Attorney, Agent, or Firm—Quarles & Brady

[57] ABSTRACT

The cermet varistors have electrodes applied to an improved varistor composition which includes a semiconductive material having zinc oxide in admixture with at least one metal oxide selected from the group consisting of chromium oxide, cobalt oxide and manganese oxide and includes a glass matrix. The glass matrix is a borosilicate glass with at least one metal oxide selected from the group consisting of cobalt oxide and manganese oxide. The improved compositions are used in varistors of both the thick film and bulk types, the resulting varistors having enhanced device characteristics, particularly high exponents of nonlinearity.

10 Claims, 3 Drawing Figures

CERMET VARISTORS

BACKGROUND OF THE INVENTION

This invention relates to cermet varistors, and more particularly to improved varistor compositions utilizable in varistors of both the thick film and bulk types.

Many varistors are currently available which have nonlinear current-voltage characteristics for suppressing transient voltages. The relationship between current and voltage in a varistor is described by the empirical relation: $I = (V/C)^\alpha$
where:
  $I$ = current flowing through the varistor
  $V$ = voltage across the varistor
  $C$ = constant proportional to the varistor
  $\alpha$ = constant > 1, measure of the non-linearity of the varistor.

In general, it is usually desirable that the $\alpha$ value be of as large a magnitude as possible, since this value represents the extent of nonlinearity of the device.

Resistors and capacitors in a thick film form are readily accessible for utilization in integrated circuits, and, consequently, the need for a varistor of the thick film type has arisen. Thick film varistors which may be employed in integrated circuits have been developed, and U.S. Pat. No. 3,725,836, issued to Wada on Apr. 3, 1973, discloses such a device. The varistor includes a composition having particles of zinc oxide with as an additive either bismuth oxide, lead oxide or barium oxide and a glass frit material which is free of any metallic oxide additives. The varistors with compositions of the above formulations made in accordance with the disclosed method are said to have $\alpha$ values within the range of 5 to 8.

Bulk type varistors have been used in applications necessitating protection from high energy transients. These varistors commonly include a pair of electrodes applied to a varistor composition containing a bonded mass of semi-conductive particles. In U.S. Pat. No. 3,496,512, granted on Feb. 17, 1970, to Matsuoka, et al., a nonlinear resistor which includes a sintered body of zinc oxide with silver paint electrodes applied to its opposite surfaces is disclosed. And, in other bulk type devices, various additives have been formulated with zinc oxide. See, for example, U.S. Pat. No. 3,632,528 issued on Jan. 4, 1972, to Matsuoka, et. al., for "Lead-Modified Zinc Oxide Voltage Variable Resistor;" U.S. Pat. No. 3,634,337 issued on Jan. 11, 1972, to Matsuoka, et al., for "Barium-Modified Zinc Oxide Voltage Variable Resistor;" U.S. Pat. No. 3,598,763 issued on Aug. 10, 1971, to Matsuoka, et al., for "Manganese-Modified Zinc Oxide Voltage Variable Resistor;" and U.S. Pat. No. 3,699,058 issued on Oct. 17, 1972, to Matsuoka, et al., for "Uranium-Modified Zinc Oxide Voltage Variable Resistor."

Thick film varistors can be made by mixing the zinc oxide composition with the glass material and a liquid vehicle to form a paste, and heating the paste after applying it to an insulating substrate. The heating temperature should be sufficient to evaporate the liquid vehicle and melt the glass material to bond the zinc oxide composition particles whereby a thick film is formed. Electrodes are then applied to the thick film. Alternatively, the paste can be applied to an electrode disposed on a substrate, and heated in the same fashion. Another electrode is then applied to the resulting thick film on its surface opposite the electrode which is in contact with the substrate. The varistor configuration is generally referred to as coplanar, if the electrodes are situated on the same surface of the thick film; and, as parallel plate, if the electrodes are located on opposite surfaces of the thick film.

Bulk varistors are typically manufactured by formulating a zinc oxide composition with a suitable binder system, and pressing the material in a mold. The pressed mass is then fired at a high temperature, electrodes are applied to its opposite surfaces, and leads are connected to the electrodes.

The proper selection of a glass material is crucial in making thick film varistors, since it bonds the zinc oxide semi-conductive particles together upon melting during exposure to high temperatures and imparts adherence properties to the thick film so that it adequately bonds to the substrate (in a coplanar configuration) or to an electrode (in a parallel plate configuration). However, it has been found that the glass material can be of importance in other respects. The thick film varistors developed thus far by the prior art have not displayed a sufficiently high nonlinearity exponent necessitated by many applications. This situation has proliferated despite attempts to increase the $\alpha$-exponent by the careful addition of certain metal oxides to the zinc oxide semi-conductive material. It is a discovery of the present invention that this result has occurred due to the migration of the metal oxide additives used from the semi-conductive material during formation of the thick film. Also, the prior art does not disclose a bulk type varistor employing a glass material in the varistor composition. It has also been found that the addition of a proper glass can result in a bulk type varistor having an elevated $\alpha$-exponent and provide a more stable device.

Furthermore, the prior art is deficient in that it does not disclose a varistor composition which can be used to form varistors of both the thick film and bulk types having high nonlinearity characteristics. It is believed that this deficiency has resulted from an inability of the known thick film varistor compositions to adequately form a cohesively bonded mass if pressed in a die; and, from the lack of a glass material in the known bulk varistor compositions which is needed to bond together the semi-conductive particles and bond the thick film to a substrate or electrode. The present invention provides novel, versatile varistor compositions which are used to form varistors of both thick film and bulk types having highly desirable characteristics in accordance with conventional processing techniques.

SUMMARY OF THE INVENTION

The present invention contemplates a varistor in which electrodes are applied to a varistor composition and having an improved varistor composition which consists essentially of zinc oxide in admixture with at least one metal oxide selected from the group consisting of chromium oxide, cobalt oxide and manganese oxide, and glass matrix consisting essentially of a borosilicate glass and at least one metal oxide selected from the group consisting of cobalt oxide and manganese oxide.

Both thick film and bulk type varistors are provided which comprise a varistor composition in contact with a pair of electrodes; however, in the thick film varistors the composition is also in association with an inert substrate. Two basic constructions are used for the thick film arrangement. In one form, the varistor composition is disposed directly on the substrate; and, on its surface opposite the substrate, a pair of electrodes are applied in substantially coplanar relation. And, in the other form, the varistor composition is sandwiched between a pair of electrodes, while one of the electrodes resides upon the substrate. The bulk type varistor includes a bonded mass of particles comprising a varistor composition, and a pair of electrodes applied to the bonded mass, the electrodes being disposed on opposite surfaces thereof.

The varistor compositions which are used in the varistors include a semi-conductive component and a glass matrix component. The semi-conductive material is a mixture of zinc oxide with chromium oxide, cobalt oxide or manganese oxide or any combination thereof, and the glass matrix is a borosilicate glass containing either cobalt oxide or manganese oxide or both. It has been found that varistors produced with compositions containing such semi-conductive material and glass matrix typically have $\alpha$ values in excess of 10.

The varistor compositions have properties which allow them to be used in making both thick film and bulk type varistors, and which further permit the manufacture of the varistors in accordance with per se well-known methods of formation. Also, as already mentioned, the resulting varistors have desirable nonlinearity characteristics, in particular, $\alpha$ commonly above 10. The reason that the composition can be used to make both types of varistors, and additionally yield varistors with enhanced device characteristics is not fully understood; however, it may be surmised that a combination of factors may be responsible.

The addition of either chromium oxide, cobalt oxide, or manganese oxide, or any combination thereof, to the zinc oxide to form the semi-conductive material elevates the $\alpha$ value in the resulting varistor device. Consequently, it is important that these oxides remain in the composition as part of its semi-conductive component during processing operations; and, subsequently, during application of the device to its working environment. There is a tendency for metal oxide additives to migrate during formation of the thick film from the semi-conductive material; and, to inhibit this migration, proper formulation of the glass matrix is required. It has been found that the addition of either chromium oxide or manganese oxide or both to a borosilicate glass to form the glass matrix, provides a varistor composition having a substantially stable, migration-free, semi-conductive component. Also, proper glass matrix formulation is very important in at least one other regard. The semi-conductive particles must bond together upon incorporation into a thick film; and, the thick film must adhere to a substrate (in the coplanar configuration) or to an electrode (in the parallel plate configuration). And, the semi-conductive particles must form a cohesively bonded mass when pressed in a die and fired in the manufacture of a bulk type device. The ability of the varistor compositions of the present invention to satisfy these requirements presents compositions with enhanced versatility for making any type of varistor required by a particular application. It is also believed that the glass formulation developed largely accounts for the improved bonding characteristics of the compositions.

It is an object of the invention to provide varistor compositions utilizable in either thick film or bulk type varistors.

It is a further object to provide varistor compositions utilizable in both types of varistors and compatible with processing techniques for fabricating them.

It is a still further object to provide improved varistors having attractive properties, in particular, high nonlinearity exponents.

The foregoing and other objects and advantages of the invention will appear from the following description. In the description reference is made to the accompanying drawings which form a part hereof, and in which there is shown by way of illustration, and not of limitation, three preferred embodiments of the invention. Such embodiments do not represent the full scope of the invention, but rather the invention may be employed in a variety of forms, and reference is made to the claims herein for interpreting the breadth of the invention.

Figure 1:
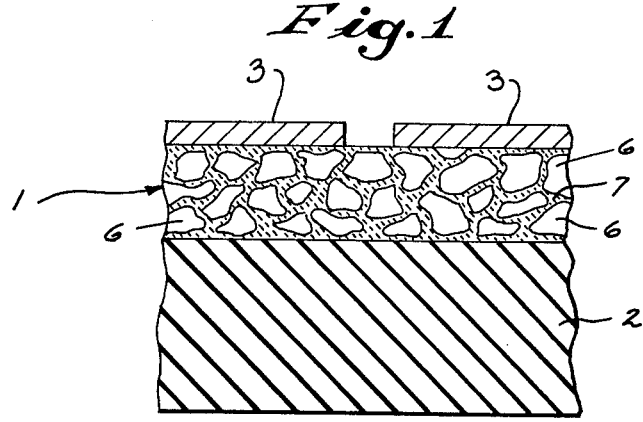
FIG. 1 is a view in cross section of a varistor embodying the present invention.

In the drawings, the various elements are greatly magnified in size, and not necessarily drawn to scale.

DESCRIPTION OF THE PREFERRED EMBODIMENTS

Figure 2:
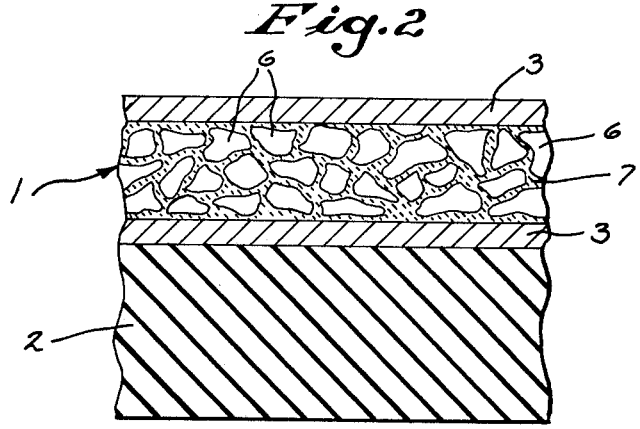
FIG. 2 is a view in cross section of a varistor comprising a second embodiment of the present invention.
Figure 3:
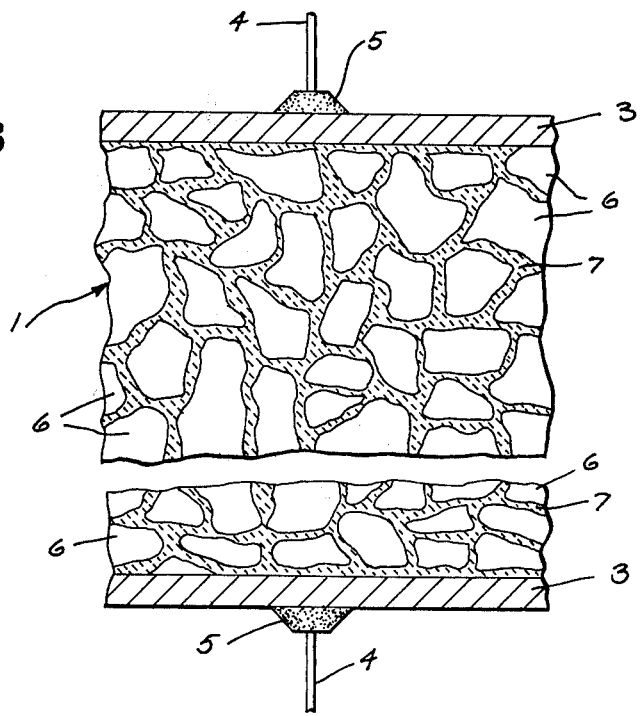
FIG. 3 is a view in cross section of a varistor comprising a third embodiment of the present invention.

Referring to FIG. 1, a thick film varistor having a coplanar configuration is shown. The varistor includes a varistor composition 1 which is applied to an inert substrate 2. The varistor composition 1 is provided with a pair of electrodes 3 on its surface opposite the substrate 2. Another thick film varistor, similar to the one shown in FIG. 1, but having a parallel plate configuration, is illustrated in FIG. 2. This varistor includes a varistor composition 1 interposed between a pair of electrodes 3, one of which is in direct contact with an inert substrate 2. With reference to FIG. 3, a bulk type varistor is shown having a varistor composition 1 intermediate a pair of electrodes 3, the composition 1 being a cohesively bonded mass of particles. A wire lead 4 is connected to each electrode 3 by solder 5 or any other suitable connecting media.

The varistor compositions used in the varistors are mixtures which include a semi-conductive component 6 and a glass matrix component 7. The semi-conductive material contains zinc oxide in admixture with either chromium oxide, or cobalt oxide, or manganese oxide, or any combination thereof. The glass matrix contains a borosilicate glass, such as either bismuth borosilicate glass or lead borosilicate glass, with cobalt oxide and/or manganese oxide.

In the manufacture of the thick film varistors, the varistor composition 1 is initially prepared. This is accomplished by properly individually formulating the semi-conductive material and the glass matrix, and then combining these two components. Zinc oxide is mixed with one or more of the metal oxides, chromium oxide, cobalt oxide and manganese oxide, and water is added to the mixture to produce a rather smooth, creamy liquid. This liquid is subjected to a milling operation; it is peferably placed in a ball mill for 6 hours at 63% critical mill speed. The milled material is then dried, pulverized and calcined in a rotary calcinerator. This latter step is carried out in a moving air atmosphere at about 1200° C for approximately 2 hours. The material obtained is milled, again the milling operation is preferably performed in a ball mill for 6 hours at 63% critical mill speed, and subsequently dried and granulated. It has been found that a particle size within the range of about 0.1 microns to 10 microns is operable, and that a size of approximately 0.8 microns is most advantageous. These particles comprise the semi-conductive component of the varistor composition.

The glass matrix 7 is prepared by mixing a borosilicate glass, for example, bismuth borosilicate glass, or lead borosilicate glass with, as an additive, either cobalt oxide or manganese oxide or both. The glass mixture is fired, and the firing can be performed in a platinum crucible in air for 1 hour at about 1200° C. After firing, the product is quenched in water, pulverized and milled, such as in a ball mill with water for 6 hours at 63% critical mill speed. Upon completion of the milling process, the material is removed from the mill and dried, and this material comprises the glass matrix component of the varistor composition.

The resulting semi-conductive material and glass matrix are then combined. A proper portion of semi-conductive material and glass matrix is mixed with an organic carrier. Suitable proportions of the two components include a range from 75 to 92 weight percent of the semi-conductive material with a range from 25 to 8 weight percent of the glass matrix. The selection of a carrier is important in that the carrier must be capable of suspending the solid components for relatively long periods of time without substantial settling, yet it must not react chemically with them. The carrier employed in the preferred embodiment is a high molecular weight organic compound, such as ethyl cellulose, dissolved in a relatively low volatility organic solvent, and contains as additives flow control agents, such as furoic acid, and wetting agents of the nonionic type. A sufficient amount of carrier is added to the solid components to form a paste having a rheolgy which will be suitable in subsequent processing steps. A paste viscosity within the range of $1.0 \times 10^5$ to $3.5 \times 10^5$ cps has been found to be acceptable.

To make the coplanar thick film varistor of FIG. 1, the paste is first applied to the substrate 2, for example, alumina or other suitable ceramic, by any acceptable method, such as screen printing. The substrate with the paste thereon is placed in a sagger which in turn is inserted into a furnace. The material is fired at a temperature within the range of 900° to 1200° C for approximately 15 to 30 minutes. It is important to point out that the interior of the sagger should be coated with a composition having the same formulation as the glass matrix. This procedure inhibits volatilization of the constituents of the glass matrix during the firing step. Within the time period of the firing cycles, the carrier will be driven away without interacting substantially with the solid components, and the glass matrix will melt developing a thick film metal oxide system. Upon proper electroding, the system will exhibit varistor characteristics, and an $\alpha$ value for the device typically in excess of 10 can be expected. Silver paste electrodes, for example, No. 6730 manufactured commercially by E. I. DuPont de Nemours and Company, Wilmington, Del., are suitable electrodes which may be applied to the thick film and fired to provide the varistor device.

Alternatively, the parallel plate varistor of FIG. 2 may be assembled by initially applying an electrode 3, such as Pd-Au in glass, to the substrate 2, rather than the paste, and firing for about 10 minutes, at 1100° C. The paste is applied to the electrode 3, and another firing step, in this instance for about 20 minutes a 1100° C, is performed to develop a thick film. A second electrode 3, such as a silver paste electrode, is then applied to the thick film on its side opposite the Pd-Au in glass electrode, and the entire combination is fired for about 10 minutes at 825° C. The Pd-Au in glass electrode may be applied to the substrate, the paste applied to the Pd-Au in glass electrode, and the second electrode applied to the thick film system using conventional techniques such as screen printing.

The paste in both thick film varistor configurations is fired at a relatively high temperature, i.e., in excess of 900° C. It has been found that high temperature firing will result in a varistor having a varistor composition which is stable during exposure to further thick film processing. The varistor device will be nonsensitive to the screen printing and further firing operations encountered when it is applied to a thick film hybrid circuit or network.

The bulk type varistor is made by first preparing the varistor composition 1. The semi-conductive material and glass matrix are individually formulated as set forth above; however, they are combined in a different manner. The semi-conductive material and glass matrix are dry mixed and added to a suitable binder system. The proportion of the solid components should be from 90 to 99 weight percent of semi-conductive material and 10 to 1 weight percent glass matrix. An acceptable binder system may include about 7.3 weight percent of a mixture of polyvinyl alcohol, polyethylene glycol, ammonium stearate, a wetting agent (such as Darvan C) and G. E. Antifoam along with about 92.7 weight percent of deionized water. Other suitable binder systems should be apparent to those skilled in the art.

The two solid components are mixed into the binder system in a ball mill, and this mixture is dried. A preferred mixture includes approximately 65 weight percent solid components and 35 weight percent binder system. The mixture should be dried to about 5 percent moisture content and then granulated. The resulting powder is pressed in a suitable die at a pressure within the range of 1,000 to 2,000 psi. The particulate mass is preliminarily baked at a temperature of about 180° C for 16 to 24 hours, and subsequently fired in a furnace at a high temperature, such as 900° to 1300° C for 0.5 to 4 hours.

Electrodes 3 are then applied to opposite surfaces of the fired varistor composition using a screen printing technique or according to any other conventional method. Silver paint electrodes have been found suitable, but many other types of electrodes could be used. Lead wires 4 can be connected to the electrodes 3 in any desired manner, and conventional solder 5 is a convenient attaching instrumentality.

The invention is illustrated and will be further understood by reference to the following examples:

EXAMPLE 1

Zinc oxide is mixed with chromium oxide, cobalt oxide, and manganese oxide in the following proportion by mole percent:

ZnO—98.8%
$CR_2O_3$—0.5%
$Co_2O_3$—0.2%
$MnO_2$—0.5%

This formulation is mixed with water to form a smooth, creamy liquid. The liquid is milled in a ball mill for 6 hours at 63% critical mill speed. The milled material is dried and pulverized, and then calcined in a rotary calcinerator in a moving air atmosphere for 2 hours at 1200° C. The calcined material is milled in a ball mill for 6 hours at 63% critical mill speed, dried and granulated to yield a doped semi-conductive material.

Bismuth borosilicate glass is mixed with cobalt oxide and manganese oxide in the following proportion by mole percent:

$B_2O_3$—23.4%
$Bi_2O_3$—19.8%
$SiO_2$—27.2%
$CoO$—15.9%
$MnO_2$—13.7%

This formulation is fired in a platinum crucible in air for 1 hour at 1200° C. The fired material is quenched in water, pulverized, milled in a ball mill with water for 6 hours at 63% critical mill speed, and dried resulting in a glass matrix.

A cement paste is formed by mixing 80% (weight) semi-conductive material and 20% (weight) glass matrix with an organic carrier which contains a vehicle consisting of 91.8% tridecanol, 7.7% ethyl cellulose, and 0.5% Santicizer and an effective amount of butyl carbito acetate to achieve a paste viscosity of $1.1 \times 10^5$ cps.

The paste is screen printed onto an alumina substrate, placed in a zirconia sagger coated with a composition having the same formulation as the glass matrix, and fired for approximately 15 minutes at 1200° C to form a thick film.

Silver paste electrodes sold commercially as No. 6730 by E. I. DuPont de Nemours and Company, Wilmington, Del., were applied to the thick film, and the device exhibited an α value greater than 10.

Following the procedure of Example 1, a varistor can be made including a varistor composition having a semi-conductive material which includes zinc oxide and as an additive either chromium oxide, cobalt oxide or manganese oxide individually or any combination thereof. Also, the glass matrix may contain a borosilicate glass other than bismuth borosilicate glass such as lead borosilicate glass.

EXAMPLE 2

A cermet paste is formed as in EXAMPLE 1. A Pd-Au in glass electrode is screen printed onto an alumina substrate, dried and fired for 10 minutes at 1100° C. The paste is screen printed onto the Pd-Au in glass electrode, placed in a zirconia sagger coated with a composition having the same formula as the glass matrix, and fired for approximately 20 minutes at 1100° C to form a thick film. A silver paste electrode sold commercially as No. 6730 by E. I. DuPont de Nemours and Company, Wilmington, Del., is screen printed onto the thick film on its side opposite the Pd-Au in glass electrode and fired for 10 minutes at 825° C. The device exhibited an α value greater than 10.

Following the procedure of EXAMPLE 2, a varistor can be made including a varistor composition having a semi-conductive material which includes zinc oxide and as an additive either chromium oxide, cobalt oxide or manganese oxide individually or any combination thereof. Also, the glass matrix may contain a borosilicate glass other than lead borosilicate glass such as bismuth borosilicate glass.

EXAMPLE 3

The doped semi-conductive material and glass matrix are formulated as in EXAMPLE 1. A binder system is prepared consisting of 92.7 weight percent of deionized water and 7.3 weight percent of the following mixture:

| | |
|---|---|
| Polyvinyl alcohol | 52.7 weight percent |
| Carbowax (polyethylene glycol) | 13.1 |
| Ammonium stearate | 26.4 |
| Darvan C (wetting agent) | 7.0 |
| G. E. Antifoam | 0.8 |
| | 100.0 weight percent |

The combination of 95 weight percent semi-conductive material and 5 weight percent glass matrix is added to the binder system in the proportion of 65 weight percent solids combination and 35 weight percent binder system, the solids combination being mixed into the binder system in a ball mill. The mixture is dried to 5% moisture content and granulated by pressure through a screen; the granulated powder is pressed in a die at a pressure between 1,000 and 2,000 psi. The particulate mass is baked at 180° C for 16 to 24 hours, and fired at a temperature of 1000° C for 1 hour. Silver paint electrodes were applied to opposite surfaces of the fired varistor composition, and lead wires soldered to the electrodes. The device exhibited an α value greater than 10. This result is shown for Sample No. 1 in Table 1.

This procedure was followed for compositions containing other proportions of semi-conductive and glass matrix components. The compositions were also subjected to different firing times and temperatures. The results are summarized in Table 1.

TABLE 1

| Sample No. | Weight Percent Semi-Conductive Material/Glass Matrix | Firing Time (Hours) | Firing Temperature (° C) | α Value |
|---|---|---|---|---|
| 1 | 95/5 | 1 | 1000 | 21.0 |
| 2 | 95/5 | 2 | 1000 | 19.0 |
| 3 | 95/5 | 4 | 1000 | 34.9 |
| 4 | 95/5 | 1 | 1100 | 34.5 |
| 5 | 95/5 | 2 | 1100 | 58.7 |
| 6 | 95/5 | 4 | 1100 | 49.4 |
| 7 | 95/5 | 1 | 1200 | 34.5 |
| 8 | 95/5 | 2 | 1200 | 65.6 |
| 9 | 95/5 | 4 | 1200 | 78.3 |
| 10 | 95/5 | 1 | 1300 | 51.8 |
| 11 | 95/5 | 2 | 1300 | 47.2 |
| 12 | 95/5 | 4 | 1300 | 20.0 |
| 13 | 98/2 | 1 | 1000 | 22.4 |
| 14 | 98/2 | 2 | 1000 | 22.0 |
| 15 | 98/2 | 4 | 1000 | 28.5 |
| 16 | 98/2 | 1 | 1100 | 47.0 |
| 17 | 98/2 | 2 | 1100 | 56.0 |
| 18 | 98/2 | 4 | 1100 | 69.0 |
| 19 | 98/2 | 1 | 1200 | 47.2 |
| 20 | 98/2 | 2 | 1200 | 42.6 |
| 21 | 98/2 | 4 | 1200 | 74.8 |
| 22 | 98/2 | 1 | 1300 | 55.4 |
| 23 | 98/2 | 2 | 1300 | 33.4 |
| 24 | 98/2 | 4 | 1300 | 16.4 |
| 25 | 99/1 | 1 | 1000 | 22.0 |
| 26 | 99/1 | 2 | 1000 | 28.5 |
| 27 | 99/1 | 4 | 1000 | 27.0 |
| 28 | 99/1 | 1 | 1100 | 33.4 |
| 29 | 99/1 | 2 | 1100 | 40.7 |
| 30 | 99/1 | 4 | 1100 | 30.0 |
| 31 | 99/1 | 1 | 1200 | 39.5 |
| 32 | 99/1 | 2 | 1200 | 73.1 |
| 33 | 99/1 | 4 | 1200 | 67.9 |
| 34 | 99/1 | 1 | 1300 | 46.7 |
| 35 | 99/1 | 2 | 1300 | 59.3 |
| 36 | 99/1 | 4 | 1300 | 8.0 |

We claim:

1. A varistor having a nonlinear current-voltage characteristic defined by the relation $I = (V/C)^\alpha$ where $I$ is the current flowing through the varistor, $V$ is the voltage across the varistor, $C$ is a constant proportional to the varistor, and $\alpha$ is a constant $> 1$ and is a measure of the nonlinearity of the varistor, said varistor having an $\alpha$ value in excess of 10, comprising:

an inert substrate;

a thick film associated with said inert substrate comprising a varistor composition consisting essentially of from about 75.0 to about 92.0 weight percent of a semi-conductive material and from about 25.0 to about 8.0 weight percent of glass matrix;

said semi-conductive material consisting predominantly of zinc oxide in admixture with a small amount of at least one metal oxide selected from the group consisting of chromium oxide, cobalt oxide and manganese oxide;

said glass matrix consisting primarily of a borosilicate glass with, as an additive, at least one metal oxide selected from the group consisting of cobalt oxide and manganese oxide; and a pair of electrodes applied to said thick film.

2. The varistor as recited in claim 1, wherein said borosilicate glass consists essentially of one member selected from the group consisting of bismuth borosilicate glass and lead borosilicate glass.

3. The varistor as recited in claim 1, wherein said varistor composition is disposed on said inert substrate and said electrodes are applied to said varistor composition on its surface opposite said inert substrate.

4. The varistor as recited in claim 1, wherein said varistor composition is interposed between said electrodes, one of said electrodes being disposed on said inert substrate.

5. A varistor as recited in claim 1, wherein said semi-conductive material approximately comprises 98.8 weight percent zinc oxide, 0.5 weight percent chromium oxide, 0.2 weight percent cobalt oxide, and 0.5 weight percent manganese oxide; and said glass matrix approximately comprises 23.4 mole percent boron trioxide, 19.8 mole percent bismuth oxide, 27.2 mole percent silicon dioxide, 15.9 mole percent cobalt oxide, and 13.7 mole percent manganese oxide.

6. The varistor as recited in claim 1, wherein said semi-conductive material comprises particles having a size within the range of from about 0.1 microns to about 10 microns.

7. A varistor having a nonlinear current-voltage characteristic defined by the relation $$I = (V/C)^\alpha$$

where $I$ is the current flowing through the varistor, $V$ is the voltage across the varistor, $C$ is a constant proportional to the varistor, and $\alpha$ is a constant $> 1$ and is a measure of the nonlinearity of the varistor, said varistor having an $\alpha$ value in excess of 10, comprising:

a bonded mass of particles comprising a varistor composition consisting essentially of from about 90.0 to about 99.0 weight percent of a semi-conductive material and from about 10.0 to about 1.0 weight percent of a glass matrix;

said semi-conductive material consisting predominantly of zinc oxide in admixture with a small amount of at least one metal oxide selected from the group consisting of chromium oxide, cobalt oxide and manganese oxide;

said glass matrix consisting primarily of a borosilicate glass with, as an additive, at least one metal oxide selected from the group consisting of cobalt oxide and manganese oxides; and a pair of electrodes applied to said bonded mass.

8. A varistor as recited in claim 7, wherein said semi-conductive material approximately comprises 98.8 weight percent zinc oxide, 0.5 weight percent chromium oxide, 0.2 weight percent cobalt oxide, and 0.5 weight percent manganese oxide; and said glass matrix approximately comprises 23.4 mole percent boron trioxide, 19.8 mole percent bismuth oxide, 27.2 mole percent silicon dioxide, 15.9 mole percent cobalt oxide, and 13.7 mole percent manganese oxide.

9. The varistor as recited in claim 7, wherein said borosilicate glass consists essentially of one member selected from the group consisting of bismuth borosilicate glass and lead borosilicate glass.

10. The varistor as recited in claim 7, wherein said semi-conductive material comprises particles having a size within the range of from about 0.1 microns to about 10 microns.

* * * * *